June 6, 1950   J. F. BLACK ET AL   2,510,859
DEGREASER CONTROL APPARATUS

Filed March 15, 1946   3 Sheets-Sheet 1

INVENTORS
JOHN F. BLACK
JAMES J. SKELLY
BY Richey & Watts
ATTORNEYS

INVENTORS
JOHN F. BLACK
BY JAMES J. SKELLY
ATTORNEYS

June 6, 1950  J. F. BLACK ET AL  2,510,859
DEGREASER CONTROL APPARATUS
Filed March 15, 1946  3 Sheets-Sheet 3
Fig. 6
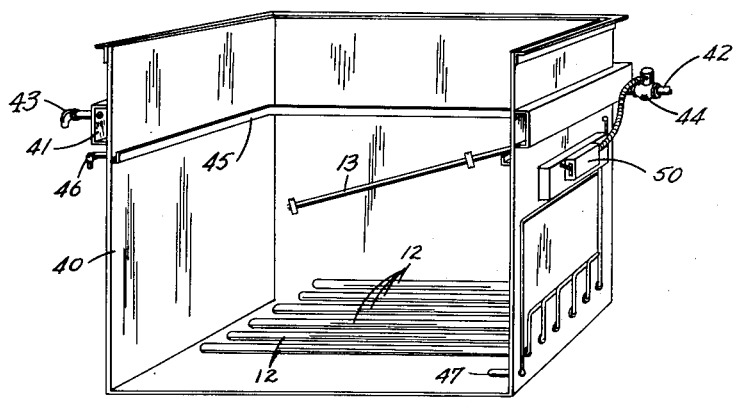
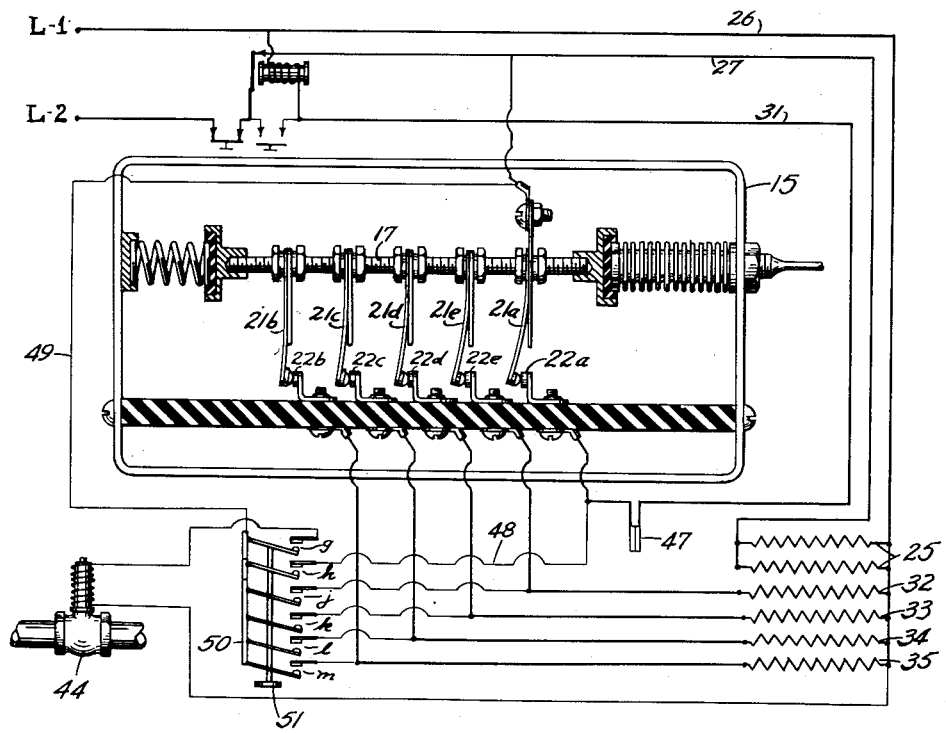
Fig. 7
INVENTORS
JOHN F. BLACK
BY JAMES J. SKELLY
ATTORNEYS Patented June 6, 1950

2,510,859

UNITED STATES PATENT OFFICE 2,510,859

DEGREASER CONTROL APPARATUS

John F. Black, Rocky River, and James J. Skelly, Cleveland Heights, Ohio, assignors to Circo Products Company, Cleveland, Ohio, a corporation of Ohio Application March 15, 1946, Serial No. 654,780

14 Claims. (Cl. 219—38)

This invention relates broadly to a degreasing apparatus and more specifically to mechanism for regulating the height of the solvent vapor generated in the degreasing tank.

One of the objects of the invention is to provide a solvent vaporizing unit having a plurality of heating elements therein and a control mechanism therefor which is designed to effect the successive operation of the heaters in response to thermal changes at various elevations in the portion of the degreasing tank that constitutes the solvent vapor chamber.

Another object of the invention is to mount an elongated thermostatic element in a degreaser in angular relation to the fluid level of the solvent therein so that substantial areas of the element will be progressively enveloped by slight increases in the elevation of the rising vapor from the solvent during the heating operation.

Another object of the invention is to provide a mechanism to effect the successive operation of a plurality of electric switches in response to the action of a thermal control unit.

Another object of the invention is to provide a plurality of heating elements, a multi-contact switch therefor and a heat responsive device being organized to effect the progressive operation of the heating elements under altitudinal thermal changes in the chamber within which the heat responsive device is mounted.

A further object of the invention is to provide a control mechanism for the height of the solvent vapor in a degreaser, the mechanism being arranged to energize a portion of the total heating capacity consonant the amount of heating effect required. Thus a small drop in vapor level will produce a small additional heating effect and a large drop in level will energize the full heating capacity.

Further objects of the invention reside in the provision of a vapor level control device which is economic of manufacture, efficient of operation, durable of structure and susceptible of installation in degreaser tanks of various size or form.

Other objects and advantages more or less ancillary to the foregoing and the manner in which all the various objects are realized will appear in the following description, which considered in connection with the accompanying drawings, sets forth the preferred embodiment of the invention.

Fig. 6 is a view in perspective of a degreaser tank illustrating a modified form of the present invention in place therein; one side wall of the tank being removed in the interest of clarity; and Fig. 7 is an elevational view of the electric switch and operating mechanism therefor including diagrammatically the heater elements, the distillation switch and thermostat and the electric connections therefor.

Figure 1:
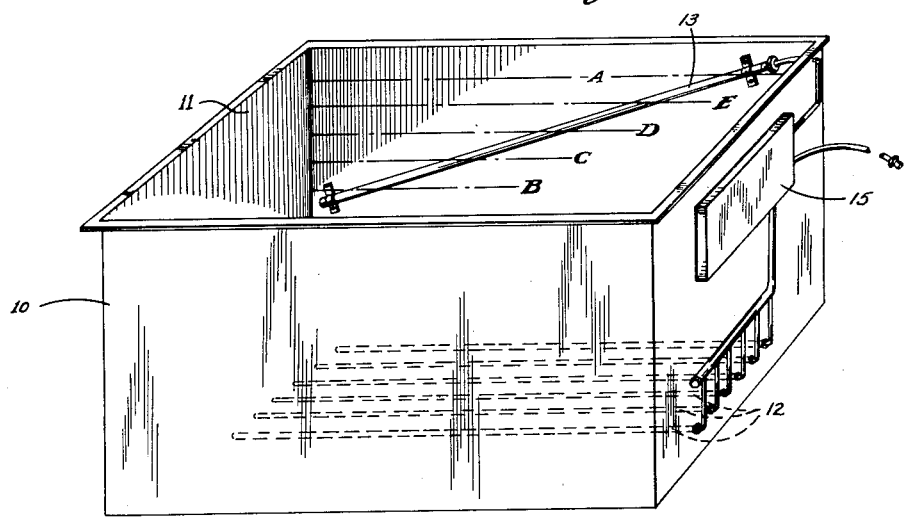
Fig. 1 is a view in perspective of a degreaser tank illustrating the improved vapor level control unit in place therein.
Figure 2:
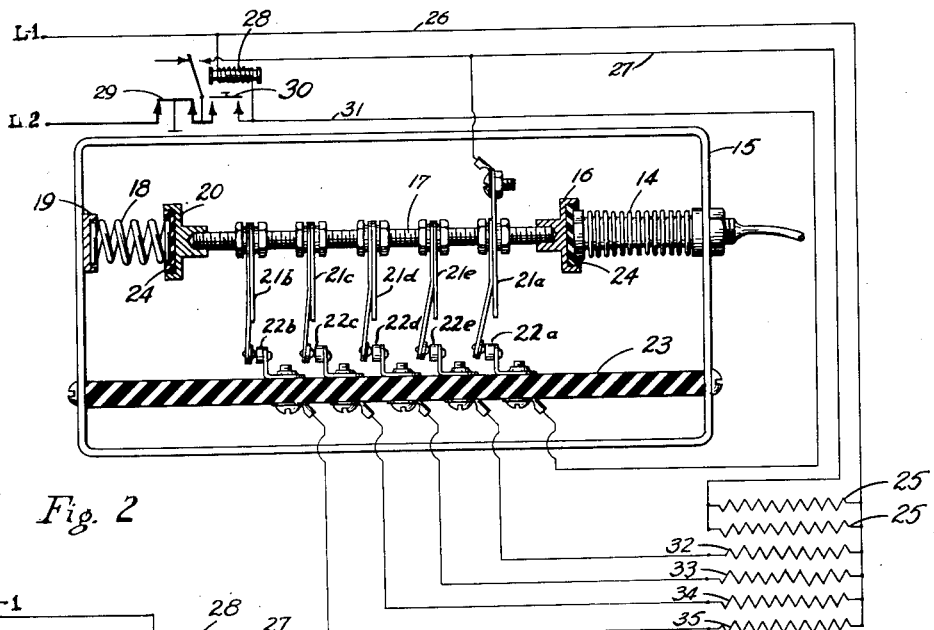
Fig. 2 is an elevational view of the electric switch and operating mechanism therefor including diagrammatically the heater elements and electric connections therefor.

Referring first to Fig. 1, the degreasing tank 10, which may be of any conventional form, comprises generally a solvent vapor chamber 11, a sump in the base thereof for the reception of the fluid solvent and an electric heating unit 12 in the lower portion of the sump. An inner side wall of the chamber 11 is provided with a tube 13 disposed at an acute angle to the surface of the fluid solvent and preferably mounted to accommodate vertical adjustment of one end thereof. The lower end of the tube 13 is sealed and the upper end thereof is mounted in fluid communication with an expansible bellows 14 (Fig. 2). The tube and bellows are filled with a thermal expansive material of the character customarily used in heat responsive devices of this type. The bellows is supported in a housing 15 preferably mounted on an outer wall of the tank 10. The free end of the bellows is provided with a cap 16 having a boss on the outer end thereof which is tapped to receive a threaded rod 17. The opposed end of the rod is supported by a spring 18 seated in a cup 19, secured to the housing 15, and a second cup 20 affixed to the rod 17. The rod is provided with a plurality of switch fingers 21 actuating the moving contacts of switches 22 which are engaged respectively with contacts mounted on a plate 23 within the housing 15. The plate 23 is formed of an electrical insulating material and the rod 17 is likewise insulated from the metal housing by fiber discs 24 within the cup 20 and cap 16.

As will be seen in Fig. 2, the electric heating unit embodies in part a pair of coils 25 coupled with a source of current through the lines 26 and 27, the line 26 being directly connected to one power line L—1 while the other line 27 is connected to the second power line L—2 through the contacts of a holding circuit relay 28 and through a normally closed switch 29. The switch 29 constitutes the stop switch of one of the usual type starting switches, and it is wired in series with the normally open switch 30 which constitutes the starter switch of the combination. As shown in Fig. 2 the electrical circuit for the degreaser is in its "off" or open condition and no current is flowing.

Figure 3:
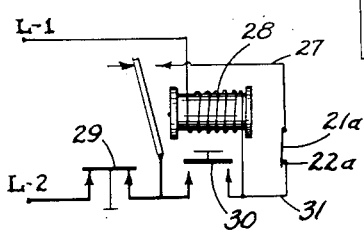
Fig. 3 is a diagrammatic view of the portion of the control which constitutes the holding circuit.

The holding circuit (Fig. 3) which serves to safeguard the operation of the degreaser should the vapor rise above a definite upper limit, comprises the relay 28 connected in series with switch fingers 21—a and the switch 22—a in the multicontact switch assembly in the housing 15. The switch arm 21—a is connected to line 27 which, as pointed out above, is connected through the solenoid contacts and the stop switch 29 to the power line L—2. One side of the solenoid coil is connected directly to the power line L—1, the opposed side being connected by line 31 to the switch contact 22—a.

Figure 4:
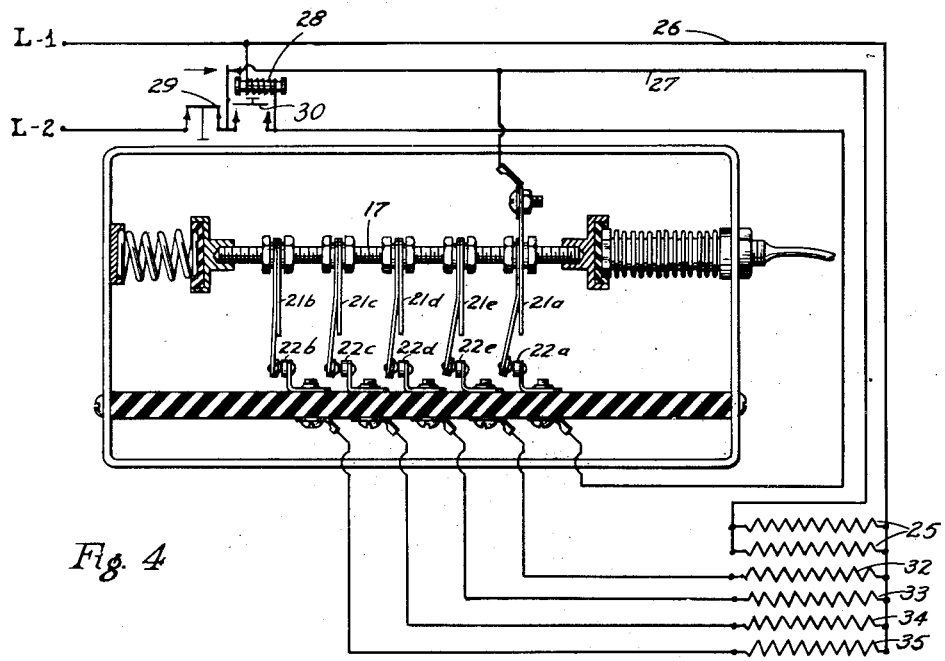
Fig. 4 is a similar view to that shown in Fig. 2, the holding circuit relay being illustrated in its actuated position.
Figure 5:
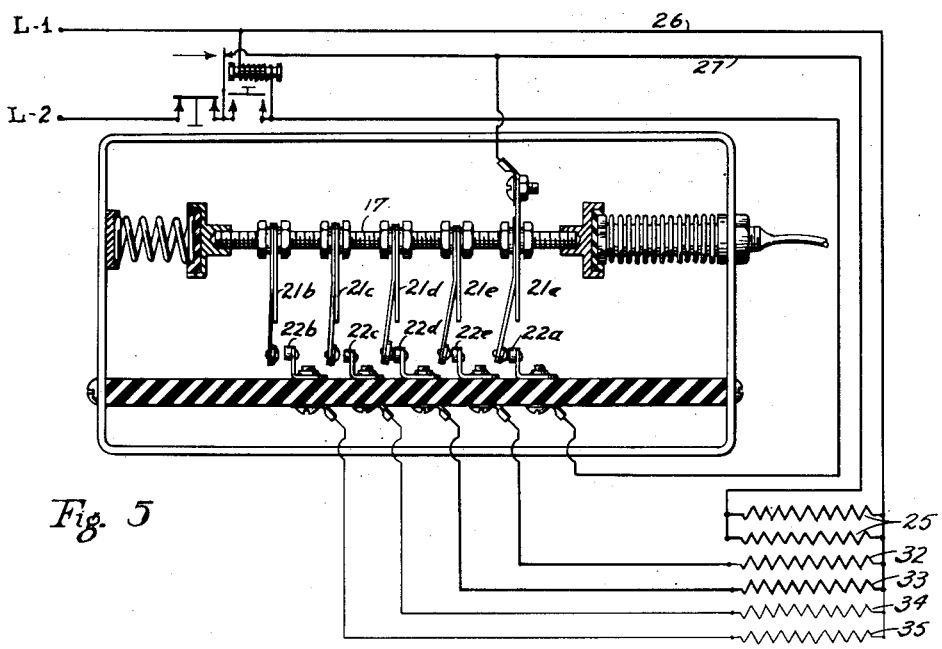
Fig. 5 is a view similar to Fig. 4 showing the electric switch mechanism with the thermostat bellows in a partially distended position.

In operation, when the starter switch 30 is closed, the circuit of the solenoid 28 is completed from the power line L—1 through the coil, through a portion of the line 31, the starter switch 30 and the "stop" switch 29 to the other power line L—2. The contacts of the relay 28 are thereby closed and the circuits through them are completed. As previously pointed out the solenoid coil is wired in series with the solenoid contacts and with the switch arm 21—a and the contact 22—a. Therefore, the solenoid is held in its actuated position until the circuit through the coil is broken, which can occur only by the opening of the stop switch or the movement of the switch arm 21—a out of contact with the contact 22—a. Likewise, the only method for closing the circuit through the coil of the solenoid 28 and heaters 25 is by closing the contacts of the starter switch 30. The heavy lines in Figs. 4 and 5 indicate the wires in which a current is flowing, and the light lines indicate wires in incomplete circuits. Fig. 4 represents the condition of the heaters and wiring immediately after closing the contacts of the starter switch 30.

With the holding circuit in its actuated position as illustrated in Fig. 4, current will flow from the power line L—1 through the heaters 25—25 and 32, 33, 34 and 35, through the contacts 22a, 22b, 22c, 22d, 22e, the switch fingers 21b, 21c, 21d, 21e, the rod 17, the switch arm 21a, the line 27, the contacts of the relay 28, the stop switch 29 to the second power line L—2.

The solvent vapor is appreciably heavier than air, and when confined by the side walls of the tank as provided herein, the vapor will rise in an even level stratum within the chamber 11. As the hot solvent vapor rises and progressively envelops the inclined tube 13, the thermal expansive material therein will effect the distention of the bellows 14 and the lateral translation of the spring-held rod 17. The inclination of the tube 13 is designed relative to the spaced relation of the switch fingers 21 and the expansive characteristic of the material within the tube so that incremental changes in height of the rising solvent vapor will effect progressive separation of the switch fingers 21 from the contacts 22 therefor. Hence, as will be seen in Figs. 1 and 5, when the portions of the tube up to lines B and C are submerged in the vapor, sufficient translation of the rod 17 will have occurred to open the circuit through the switches 21b—22b and 21c—22c and thus break the circuit to the heating elements 34 and 35. It will readily be seen that further submersion of the tube will heat a greater amount of fluid therein and will cause further translation of the rod 17. Thus when the vapor level reaches the lines D and E the translation of the rod will break the circuits through the switch fingers 21d and 21e and the contacts therefor 22d and 22e, which control the circuits through the heaters 33 and 32 respectively.

The thermal output capacity of the heating elements 25—25 is designed relative to the size of the degreaser tank and the heat losses therefrom to maintain the height of the solvent vapor at a point approximately midway between the surface of the fluid solvent and the line B in Fig. 1. Thus these particular heaters are in use throughout the operation of the degreaser, the further control of the height of the solvent vapor being governed by the selective control of the heaters 32, 33, 34 and 35.

During normal operation the switch finger 21a remains in contact with the contact 22a. The operation of the degreaser will be safeguarded by the action of the limiting switch arm 21a, for in the event that the vapor in the chamber 11 reaches a predetermined maximum height (line A in Fig. 1), the translation of the rod 17 will be sufficient to separate the arm 21a from its contact 22a. This action breaks the holding circuit and the relay solenoid is de-energized restoring the circuit to the condition illustrated in Fig. 2. An additional safety thermostat may be installed in the tank adjacent the heating coils and wired in series in the holding circuit similar to the thermostat 47 shown in Figs. 6 and 7. The function of the thermostat in either case is to open the holding circuit and interrupt the current to all the heaters when the liquid solvent reaches a predetermined temperature.

It will be recognized that the sensitivity of the thermostatic element may be altered by adjusting the angle of the tube 13 in such a manner as to vary the length of the switch-controlling sections that are submerged in the vapor, or by rearranging the position of the switch fingers relative to their contacts and to each other. It will be further recognized that other operative characteristics of the thermostatically-controlled switches may be obtained by using a tube of tortuous form and arranging the connections therefor in such a manner as to effect the time and/or requisite order of operation of the switches.

In the modified embodiment of the invention illustrated in Figs. 6 and 7, the tank 40 is provided with the necessary equipment for purifying the spent or grease-laden solvent by distillation. A portion of the tank adjacent the upper edge is surrounded by a water jacket 41 designed to accommodate the circulation therethrough of cold water. The jacket 41 is provided with an inlet pipe 42 connected to a suitable source of cold water and outlet 43 open to the atmosphere and arranged to feed into a drain. The flow of water into the jacket and the consequent cooling effect of the wall of the tank encased thereby is controlled by a solenoid valve 44 installed in the water inlet and electrically connected to the modified vapor level control circuit illustrated in Fig. 7.

As will be seen in Fig. 6, the tank 40 is provided with a trough or dam 45 secured to the inner surface of the side and end walls thereof subjacent the portion of the walls encased by the cooling water jacket 41. The distilling operation is effected by heating the spent solvent in the bottom of the tank 40 at a rate adequate to raise the solvent vapor to the level of the water jacket 41. The vapor in contact with the cold portion of the walls condenses and is collected in the dam 45 whence it is drained through the solvent drain pipe 46.

A distillation thermostat 47 is installed in the lower portion of the tank 40 and is arranged to interrupt the circuit to the heating coils 12 when the temperature of the solvent residue reaches a predetermined maximum.

The solvent vapor level control mechanism is similar to that of the preferred embodiment heretofore described and includes a thermal responsive element in the form of an elongated tube 13 secured to an inner wall of the tank 40 in acute angular relation with the horizontal. The upper end of tube 13 is preferably below the bottom of the dam 45 as in Fig. 6; however, it may be installed across the level of the dam either by forming the tube around the dam or interrupting the latter to accommodate the tube.

Referring now to Fig. 7 wherein is illustrated the vapor level control mechanism and the electric circuit therefor as modified to include the distillation control circuit, it will be noted that the vapor control mechanism is identical with the mechanism shown in Figs. 1 to 5. The box 15 houses the longitudinally adjustable rod 17 supporting a plurality of switch arms 21, the rod being actuated by the extensible bellows 14 in fluid communication with the tube 13.

In this embodiment the holding circuit through the switch 21a and 22a is altered by connecting the distillation thermostat 47 in line 31 in series relation with switch 21a and 22a. During distilling operation the vapor level is above the upper end of the tube 13 and the switch 21a and 22a is therefore held open. To prevent the breaking of the holding circuit, the switch 21a and 22a is shunted through lines 48 and 49 and contacts h of a gang switch 50. The gang switch is designed to effect the simultaneous making and breaking of a plurality of contacts g, h, j, k, l and m by the manual actuation of a switch rod 51. As shown, the switch arms are all connected to line 49 which in turn is connected to the switch arm 21a in the vapor control mechanism and thence to power line L—2 through the contacts of relay 28. One terminal of the solenoid coil of valve 44 is connected to line 26 and the other terminal is wired to contact g of gang switch 50. The four control heating coils 32, 33, 34 and 35 are connected to contacts j, k, l and m respectively. It will readily be seen that actuation of the lever 51 to close the contacts of gang switch 50 will energize the heaters and the holding circuit regardless of the successive opening of the switches as biased by the bellows 14 in the vapor control mechanism. The simultaneous closure of the contacts g of switch 50, effects the opening of solenoid valve 44 and the flow of cold water through the water jacket 41.

In operation for degreasing purposes the gang switch 50 is opened leaving the vapor control circuit similar to that shown in Figs. 1 to 5, the only difference being the series installation of the distillation thermostat 47 in line 31 of the holding circuit. Inasmuch as the thermostat 47 remains closed during degreasing operations with substantially pure solvent, the vapor level control mechanism and circuit therefor functions in a manner similar to that shown in Figs. 1 to 5.

When the solvent becomes so grease-laden as to preclude efficient degreasing it may be purified by closing the distillation gang switch 50 which, as heretofore described, shunts the holding and heater circuits around the vapor level control mechanism and opens the cooling water valve 44. The solvent vapor, substantially free of grease, condenses on the cool portion of the walls, drains into the trough 45 and is collected through the solvent drain pipe 46. The heavy grease residue in the bottom of the tank 40 is then removed manually, the purified solvent together with sufficient new solvent is placed in the tank, and the degreaser is again ready for grease removal operations.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

The term "lockout means" as used in the claims defines a device which operates automatically from a first condition to a second but will not return from the second condition to the first without manual intervention.

What we claim is:

1. In a degreaser embodying a tank for a solvent, mechanism for control of the vaporization of the solvent comprising a plurality of electric heating elements, a tube in the tank above the level of liquid solvent inclined downwardly so as to pass through the desired surface level of vaporized solvent, an extensible bellows in fluid communication with said tube, a thermal expansive material expanded in said tube and actuating said bellows, a rod coupled with said bellows, and electric switches actuated by said rod connected respectively to said heating elements, the switches being arranged for serial operation by movement of the rod.

2. In a degreaser embodying a tank for a solvent, mechanism for vaporizing the solvent and controlling the solvent vapor level in the tank, comprising a plurality of electric heaters mounted in the base of the tank, an elongated thermostatic element in the tank disposed in inclined relation to the base thereof and extending through the normal range of vapor level, and a plurality of switches actuated successively by said thermostat, said switches being electrically connected with said heaters so as to deenergize the heater progressively with rise in vapor level.

3. A degreaser comprising a tank for a solvent, a plurality of electric heaters therein, an elongated tube in said tank adapted to be progressively influenced by rising solvent vapor, an extensible bellows connected to said tube, a thermal expansive material in said tube and bellows, a multi-contact switch actuated by said bellows, switch elements in said multi-contact switch arranged for sequential operation, electric connections between certain of the switch elements and the electric heaters, and thermostatically controlled lockout switch means to interrupt the circuit to all of the heaters.

4. In a degreaser embodying a tank for a solvent, mechanism for the control of the vaporization thereof comprising a plurality of parallel-connected electric heaters, an energizing switch for each heater, a tube in said tank above the level of liquid solvent arranged with one end thereof closer to the bottom of the tank than the other, an extensible bellows connected to said tube, a thermal expansive material expanded in said tube and actuating said bellows, means coupled with said bellows to actuate said switches, and means associated with said switches to effect the successive operation thereof.

5. In a degreaser embodying a tank for a solvent, mechanism for the vaporization thereof comprising a plurality of heaters, electric switches therefor, an elongated thermostatic element in the tank disposed above the level of liquid solvent and inclined towards the base thereof, and means actuated by said thermostatic element to effect the sequential operation of said switches.

6. In a degreaser embodying a tank for a solvent and a plurality of electric heating elements, mechanism for the control of said heaters comprising a tube in the tank above the solvent level, an extensible bellows in fluid communication with said tube, a thermal expansive fluid in said tube and bellows, a multi-contact switch actuated by said bellows, contacts in said switch electrically connected to the heating elements, a holding circuit arranged to control the flow of current to all of the heaters, and thermal responsive means to interrupt said holding circuit.

7. A heater for vaporizing a solvent in a degreaser tank comprising a plurality of electric heating elements, a switch for the control of each of said elements, an elongated bulb in the tank above the liquid solvent level inclined to the vertical, a thermal expansive material in said bulb and means for actuating said switches successively by the expansion of said material.

8. A degreasing apparatus comprising a tank for a solvent, a plurality of electric heating elements therein, electric switches for operating said elements, a thermostatic element for actuating said switches, means controlled by said thermostat for operating certain of the switches successively, and means for breaking and holding open the circuit to all of the switches simultaneously actuated by the thermostat upon increase in temperature of the thermostat above that required to open the said certain switches.

9. A degreaser comprising a tank for a solvent, a plurality of parallel-connected electric heating elements therein, a multi-contact switch therefor, each contact being coupled for the operative control of a separate heating element, a thermostatic element for actuating said multi-contact switch, and means actuated by said switch for breaking and holding open the circuit to all of said heating elements when certain of said contacts are broken.

10. A degreaser comprising a tank for a solvent, a plurality of electric heaters therein, an elongated tube in said tank inclined to the vertical axis thereof and located above the liquid solvent level, an extensible bellows connected to said tube, a thermal expansive material in said tube and bellows, a multi-contact switch connected to said bellows for successive operation of switch elements, electric connections between the switch elements and the heaters, the electrical connections for one of the switch elements being arranged to break the electric circuit to all of the heaters upon maximum actuation of the bellows.

11. A degreaser comprising a tank adapted to contain a solvent in liquid form in the lower part thereof, a heater for vaporizing the solvent, a temperature-responsive device in the tank in the region of the desired upper boundary of the vaporized solvent and extended in altitude so as to be progressively more strongly affected by the vapor as the level thereof rises, and means for progressively decreasing the energy of the heater as the vapor level rises controlled by the said device.

12. A degreaser comprising a tank adapted to contain a solvent in liquid form in the lower part thereof, a plurality of heaters for vaporizing the solvent, a temperature-responsive device in the tank in the region of the desired upper boundary of the vaporized solvent and extended in altitude so as to be progressively more strongly affected by the vapor as the level thereof rises, and means controlled by the said device for progressively deenergizing heaters as the vapor level rises on the device and progressively energizing heaters as the vapor level declines on the device.

13. A degreaser comprising a tank adapted to contain a solvent in liquid form in the lower part thereof, a heater for vaporizing the solvent, a temperature-responsive device in the tank in the region of the desired upper boundary of the vaporized solvent and extended in altitude so as to be progressively more strongly affected by the vapor as the level thereof rises, means for varying the energy of the heater controlled by the said device, and lockout means for deenergizing the heater actuated by the said device upon the occurrence of a predetermined vapor level.

14. A degreaser comprising a tank adapted to contain a solvent in liquid form in the lower part thereof, a heater for vaporizing the solvent, a temperature-responsive device comprising an elongated sensitive element in the tank in the region of the desired upper boundary of the vaporized solvent and extended in altitude so as to be progressively more strongly affected by the vapor as the level thereof rises, and means for varying the energy of the heater controlled by the said device, the element being disposed at an acute angle to the horizontal so as to be more sensitive to vapor level.

JOHN F. BLACK.
JAMES J. SKELLY.

REFERENCES CITED

The following references are of record in the file of this patent:

UNITED STATES PATENTS

| Number | Name | Date |
| --- | --- | --- |
| Re. 20,359 | Robertson | May 11, 1937 |
| 999,710 | Freas | Aug. 1, 1911 |
| 1,289,617 | Berry | Dec. 31, 1918 |
| 1,374,230 | Petrovics | Apr. 12, 1921 |
| 1,459,049 | DeKhotinsky | June 19, 1923 |
| 1,664,229 | Staege | Mar. 27, 1928 |
| 1,725,006 | Kelp | Aug. 20, 1929 |
| 1,978,362 | Fonseca | Oct. 23, 1934 |
| 2,023,544 | Pierson | Dec. 10, 1935 |
| 2,252,550 | Bragg | Aug. 12, 1941 |
| 2,253,579 | Phillips et al. | Aug. 26, 1941 |
| 2,329,674 | Phillips et al. | Sept. 14, 1943 |
| 2,366,949 | Woppman et al. | Jan. 9, 1945 |